United States Patent
Arlt et al.

[15] 3,673,254
[45] June 27, 1972

[54] PROCESS FOR THE PRODUCTION OF 2-CHLOROALKYL-(OR CYCLOALKYL)-ISOCYANIDE DICHLORIDES

[72] Inventors: Dieter Arlt, Cologne, Buchheim; Hans Holtschmidt, Leverkusen-Schlebusch, both of Germany

[73] Assignee: Farbenfabriken Bayer Aktiengesellschaft, Leverkusen, Germany

[22] Filed: June 17, 1968

[21] Appl. No.: 737,370

[30] Foreign Application Priority Data

Aug. 7, 1967  Germany..............................F 53/59

[52] U.S. Cl......................260/566 D, 260/327 R, 260/332.1, 260/453 R, 260/659 R, 260/660, 260/999
[51] Int. Cl..........................................................C07c 119/00
[58] Field of Search ...............260/566 D, 327 R, 332.1, 659, 260/600

[56] References Cited

UNITED STATES PATENTS

| | | | |
|---|---|---|---|
| 3,301,898 | 1/1967 | Degener et al.........................| 260/566 |
| 3,190,918 | 6/1965 | Holtschmidt..........................| 260/566 |

*Primary Examiner*—Bernard Helfin
*Assistant Examiner*—Gerald A. Schwartz
*Attorney*—Burgess, Dinklage & Sprung

[57] ABSTRACT

Production of 2-chloro-alkyl-(or cycloalkyl or aromatic)-isocyanide dichlorides by reacting an olefin of the formula

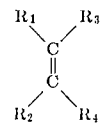

in which $R_1$ to $R_4$ each individually is hydrogen, alkyl, cycloalkyl, aromatic having up to 10 carbon atoms, or such radicals optionally substituted with $NO_2$, halo, or alkoxy, or $R_1$ and $R_2$ together with the

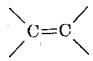

group form an alicyclic ring system optionally containing an $—SO_2$—group with hydrocyanic acid and with a chlorine-contributing compound, e.g. chlorine or sulfuryl chloride, in an amount at least equivalent to the sum total of the quantities of olefin and hydrocyanic acid used, e.g. at a temperature of about $-10°$ to $+40°$ C; the produced isocyanide dichlorides having the corresponding formula

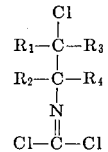

in which $R_1$ to $R_4$ are the same as defined above, including $—N CCl_2$ as optional further substituent for said substituted radicals, and being usable as intermediates for producing plastics auxiliaries, or directly for the production of isocyanates which optionally may be converted in turn with amines into ureas in the known manner, or directly as plant protection agents.

6 Claims, No Drawings

PROCESS FOR THE PRODUCTION OF 2-CHLOROALKYL-(OR CYCLOALKYL)-ISOCYANIDE DICHLORIDES

It has been found that novel 2-chloroalkyl isocyanide dichlorides, in addition to dichloroalkanes, can be produced by reacting an olefin corresponding to the general formula:

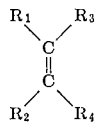

in which $R_1$ to $R_4$ represent hydrogen, an optionally substituted alkyl or cycloalkyl radical or an optionally substituted aromatic radical, or $R_1$ and $R_2$ together form part of an alicyclic ring system in which one methylene group may optionally be replaced by $SO_2$ with hydrocyanic acid and chlorine or sulphuryl chloride, for which purpose the amount of chlorine or sulphuryl chloride used is at least equivalent to the sum total of the quantities of the olefin and hydrocyanic acid used.

Suitable optionally substituted alkyl radicals include, for example, linear or branched alkyl radicals containing from one to 20, and preferably from one to six, carbon atoms.

Radicals containing from five to 12 and preferably between five and six carbon atoms in the ring system are mentioned as examples of cycloaliphatic radicals. The following are mentioned as examples of substituents on the aliphatic or cycloaliphatic radical: $NO_2$, halogens (preferably fluorine, chlorine or bromine), $-N = CCl_2$ and alkoxy (preferably one to four carbon atoms).

As a rule, the total number of carbon atoms in the radicals $R_1$ to $R_4$ is no more than 20. Preferred optionally substituted aromatic radicals include those with up to 10 carbon atoms in the ring system, in which case generally no more than two of the radicals $R_1$ to $R_4$ represent an aromatic radical. $NO_2$, halogens (preferably fluorine, chlorine or bromine), $-N = CCl_2$ or alkoxy (preferably one to four carbon atoms) are mentioned as examples of substituents on the aromatic radical.

The following are mentioned by way of example as starting compounds: ethylene, propylene, isobutylene, 2-methyl-2-butene, diisobutylene, isononylene, isododecylene, 1-dodecene, hexa-1-decene and octa-1-decene; also, cyclopentene, butadiene sulphone, cyclohexene and cyclododecane, arylalkenes such as styrene and α-methylstyrene. Olefinic compounds containing other functional groups are also suitable, examples being allyl chloride, methallyl chloride, p-chlorostyrene and p-methoxystyrene, p-butoxystyrene, o-bromostyrene, 2-chloro-4-nitrostyrene and 4-fluoro-2-chlorostyrene.

The quantity in which the olefin is used is intended to be at least equivalent to the hydrocyanic acid reacted, the olefin preferably being used in excess in relation to the hydrocyanic used. It is also possible, however, to use excess hydrocyanic acid as the solvent for the reaction. In this case, equivalent quantities of olefin and chlorine or sulphuryl chloride are reacted in excess hydrocyanic acid, any unreacted hydrocyanic acid is distilled off and the reaction mixture is subsequently reacted with chlorine or sulphuryl chloride in a quantity equivalent to the amount of hydrocyanic acid reacted.

The reaction is carried out at a temperature which is preferably between approximately −10° and 40° C. The reactants may also be reacted in neutral solvents.

The 2-chloroalkyl isocyanide dichlorides are then isolated from the reaction mixture by fractional distillation.

Such isocyanide dichloride compounds, as the artisan will appreciate, have the corresponding formula

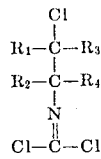

in which $R_1$ to $R_4$ are the same as defined above, including $-N=CCl_2$ as optional further substituent for said substituted radicals.

In the case of the reaction of cyclohexene, hydrocyanic acid and chlorine, the process according to the invention may be illustrated by the following reaction diagram:

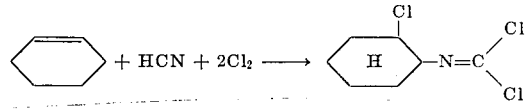

The novel isocyanide dichlorides are valuable intermediate products for the production of plastics auxiliaries. However, they may also be directly used for the production of isocyanates, for example 107 g (= 0.5 mol) of 2-chlorocyclohexyl isocyanide dichloride are dissolved in 200 ml of dichlorobenzene. 48 g (= 0.5 mol) of methane sulphonic acid are added dropwise with stirring at 20° C., hydrogen chloride being given off as the reaction mixture increases in temperature. The mixture is heated to 150° C. over a period of 15 minutes and is then subjected to fractional distillation in vacuo. 2-chlorocyclohexyl isocyanate boiling at 94°–97° C/13 Torr is obtained in a yield of 66 g (or 82 percent of the theoretical).

The other isocyanide dichlorides may also be used for the production of isocyanates. In addition, the isocyanates thus prepared may be converted with amines into ureas as known per se. The isocyanide dichlorides produced by the process according to the invention may also be directly used as plant protection agents.

EXAMPLE 1

355 g (5 mol) of chlorine are introduced with stirring and cooling at −10° to −5° C. into a mixture of 54 g (2 mols) of hydrocyanic acid and 246 g (3 mols) of cyclohexene. The reaction products are distilled off from the reaction vessel in vacuo and separated by fractional distillation in vacuo. In addition to 1,2-dichlorocyclohexane, 2-chlorocyclohexyl isocyanide dichloride of B.P.$_{0.7}$ = 83°–90° C. is obtained in a yield of 180 g (42 percent of the theoretical, based on the hydrocyanic acid used).

EXAMPLE 2

84 g (3 mols) of ethylene and 213 g (3 mols) of chlorine are simultaneously reacted at −5° C. in 80 ml (2 mols) of hydrocyanic acid. The reaction mixture is reacted with another 142 g (2 mols) of chlorine at a temperature of 0° C. In addition to 1,2-dichloroethane, 2-chloroethyl isocyanide dichloride of B.P.$_{12}$ = 57°–58° C. is obtained in a yield of 48 g (15 percent of the theoretical) by subjecting the reaction mixture to fractional distillation.

EXAMPLE 3

164 g (2 mols) of cyclohexene and 270 g (2 mols) of sulphuryl chloride are simultaneously added dropwise to 80 ml (2 mols) of hydrocyanic acid, the reaction mixture being cooled to 0° C. Another 270 g (2 mols) of sulphuryl chloride are then added dropwise to the reaction mixture. 2-chlorocyclohexyl isocyanide dichloride of B.P.$_{0.7}$ 85°–90° C. is obtained in a yield of 86 g (or 20 percent of the theoretical) by fractional distillation in vacuo.

We claim:

1. Process for the production of 2-chloro-alkyl-(or cycloalkyl or aromatic)-isocyanide dichlorides, which comprises reacting an olefin of the formula

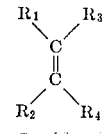

in which $R_1$ to $R_4$ each individually is selected from the group consisting of hydrogen, alkyl having one to six carbon atoms, cycloalkyl having five to six ring carbon atoms, aryl having up to 10 ring carbon atoms, and such alkyl, cycloalkyl and aryl which are substituted with substituents selected from the group consisting of $NO_2$, halo, —N ccl$_2$ and alkoxy having one to four carbon atoms, with the proviso that $R_1$ and $R_2$ when taken together with the

group form a member selected from the group consisting of an unsubstituted alicyclic ring system, and such unsubstituted ring system containing a —$SO_2$— group, and a substituted alicyclic ring system and such substituted ring system containing a —$SO_2$— group, wherein the substituents are selected from the group consisting of $NO_2$, halo, —N CCl$_2$ and alkoxy having one to four carbon atoms with hydrocyanic acid and a chlorine-contributing compound selected from the group consisting of chlorine and sulfuryl chloride, said chlorine-contributing compound being used in an amount at least equivalent to the sum total of the quantities of olefin and hydrocyanic acid used.

2. Process according to claim 1 wherein the reaction is carried out at a temperature substantially between about —10° to +40° C.

3. Process according to claim 1 for the production of 2-chloro-alkyl-(or cycloalkyl or aromatic)-isocyanide dichlorides, which comprises reacting an olefin of the formula

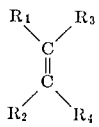

in which $R_1$ to $R_4$ each individually is selected from the group consisting of hydrogen, alkyl having one to six carbon atoms, cycloalkyl having five to six ring carbon atoms, aryl having up to 10 ring carbon atoms, and such alkyl, cycloalkyl and aryl which are substituted with substituents selected from the group consisting of $NO_2$, fluoro, chloro, bromo, N = CCl$_2$ and alkoxy having one to four carbon atoms, with the proviso that $R_1$ and $R_2$ when taken together with the

group form a member selected from the group consisting of an unsubstituted alicyclic ring system and such unsubstituted ring system containing a —$SO_2$— group, and a substituted alicyclic ring system and such substituted ring system containing an — $SO_2$— group, wherein the substituents are selected from the group consisting of $NO_2$, halo, —N CCl$_2$ and alkoxy having one to four carbon atoms the total number of carbon atoms in the radicals $R_1$ to $R_4$ being at most 20, and at most two of said $R_1$ to $R_4$ radicals being aryl, with hydrocyanic acid and a chlorine-contributing compound selected from the group consisting of chlorine and sulfuryl chloride, said chlorine-contributing compound being used in an amount at least equivalent to the sum total of the quantities of olefin and hydrocyanic acid used, whereby to produce the corresponding compound of the formula

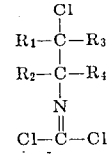

in which $R_1$ to $R_4$ are the same as defined above, with the proviso that such alkyl, cycloalkyl and aryl substituents are selected from the group consisting of $NO_2$, fluoro, chloro, bromo, —N CCl$_2$ and alkoxy having one to four carbon atoms.

4. Process according to claim 1 for the production of 2-chloro-alkyl-(or cycloalkyl or aromatic)-isocyanide dichlorides, which comprises reacting an olefin selected from the group consisting of ethylene, propylene, isobutylene, 2-methyl-2-butene, diisobutylene, isononylene, isododecylene, 1-dodecene, hexa-1-decene, octa-1-decene, cyclopentene, butadiene sulfone, cyclohexane, cyclododecane, styrene, α-methylstyrene, allyl chloride, methallyl chloride, p-chlorostyrene, p-methoxy-styrene, p-butoxystyrene, o-bromostyrene, 2-chloro-4-nitrostyrene and 4-fluoro-2-chlorostyrene, with hydrocyanic acid and a chlorine-contributing compound selected from the group consisting of chlorine and sulfuryl chloride, said chlorine-contributing compound being used in an amount at least equivalent to the sum total of the quantities of olefin and hydrocyanic acid used, whereby to produce the corresponding isocyanide dichloride.

5. Process according to claim 1 wherein $R_1$ to $R_4$ each individually is selected from the group consisting of hydrogen and alkyl having one to six carbon atoms, with the proviso that $R_1$ and $R_2$ when taken together with the

group form a corresponding cycloaliphatic ring having five to six carbon atoms.

6. Process according to claim 1 which comprises reacting an olefin selected from the group consisting of ethylene and cyclohexene with hydrocyanic acid and a chlorine-contributing compound selected from the group consisting of chlorine and sulfuryl chloride, said chlorine-contributing compound being used in an amount at least equivalent to the sum total of the quantities of olefin and hydrocyanic acid used, at a temperature substantially between about —10° to +40° C whereby to form the corresponding isocyanide dichloride selected from the group consisting of 2-chloroethyl- and 2-chlorocyclohexylisocyanide dichloride.

* * * * *

UNITED STATES PATENT OFFICE
CERTIFICATE OF CORRECTION

Patent No. 3,673,254            Dated June 27, 1972

Inventor(s) Dieter Arlt and Hans Holtschmidt

It is certified that error appears in the above-identified patent and that said Letters Patent are hereby corrected as shown below:

Col. 2, in the formula, "$C\begin{smallmatrix}\diagup Cl\\ \diagdown Cl\end{smallmatrix}$" should read -- $C\begin{smallmatrix}\diagup Cl\\ \diagdown Cl\end{smallmatrix}$ + HCl --

Col. 3, line 6, "-N  $CCl_2$" should read -- $-N=CCl_2$ --

Col. 3, line 18, "-N  $CCl_2$" should read -- $-N=CCl_2$ --

Col. 3, line 57 "-N  $CCl_2$" should read -- $-N=CCl_2$ --

Col. 4, line 19, "-N  $CCl_2$" should read -- $-N=CCl_2$ --

Signed and sealed this 2nd day of January 1973.

(SEAL)
Attest:

EDWARD M. FLETCHER, JR.            ROBERT GOTTSCHALK
Attesting Officer                      Commissioner of Patents